(12) United States Patent
Hsu et al.

(10) Patent No.: US 6,975,377 B2
(45) Date of Patent: Dec. 13, 2005

(54) LIQUID CRYSTAL DISPLAY DEVICE AND THIN FILM TRANSISTOR SUBSTRATE THEREOF

(75) Inventors: Hsin Fa Hsu, Tainan (TW); Hsin Ta Lee, Tainan (TW)

(73) Assignee: Chi Mei Optoelectronics Corp., (TW)

( * ) Notice: Subject to any disclaimer, the term of this patent is extended or adjusted under 35 U.S.C. 154(b) by 67 days.

(21) Appl. No.: 10/159,109

(22) Filed: Jun. 3, 2002

(65) Prior Publication Data

US 2003/0095225 A1    May 22, 2003

(30) Foreign Application Priority Data

Nov. 22, 2001  (TW) .............................. 90129166 A

(51) Int. Cl.[7] .......................................... G02F 1/1345
(52) U.S. Cl. ..................... 349/152; 349/44; 349/110; 349/149; 349/151
(58) Field of Search .................. 349/110, 44, 111, 349/152, 151, 149

(56) References Cited

U.S. PATENT DOCUMENTS

| | | | |
|---|---|---|---|
| 5,349,226 A | * | 9/1994 | Kawaguchi et al. ........ 257/347 |
| 5,745,202 A | * | 4/1998 | Yamauchi et al. .......... 349/110 |
| 5,850,275 A | | 12/1998 | Watanabe et al. |

* cited by examiner

*Primary Examiner*—Dung T. Nguyen
*Assistant Examiner*—George Wang

(57) ABSTRACT

An LCD device comprises a plurality of transparent pixel electrodes, a first substrate, a second substrate, a liquid crystal material, and a light shield device. The first substrate has a plurality of terminals electrically connected to the transparent pixel electrodes via a plurality of outgoing lines, and the terminals are gathered to define a plurality of terminal groups, thereby defining a plurality of outgoing line groups. The second substrate has opposing electrodes opposite to the transparent pixel electrodes. The liquid crystal material is sealed between the first and second substrates. The light shield device is adjacent to the outgoing line groups and the terminal groups and adjacent to the outgoing lines within the outgoing line groups and the terminals within the terminal groups, but not touching the outgoing lines and the terminals for preventing the light leakage on the edge of the liquid crystal display.

8 Claims, 7 Drawing Sheets

LIQUID CRYSTAL DISPLAY DEVICE AND THIN FILM TRANSISTOR SUBSTRATE THEREOF

BACKGROUND OF THE INVENTION

1. Field of the Invention

The present invention generally relates to a liquid crystal display device, and more particularly to a thin film transistor substrate of the liquid crystal display having light-shield device to prevent light leakage.

2. Description of the Related Art

Due to the advance of electronic technology, especially for the popularity of portable electronic products, the requirements of light, compact and low-energy consuming display are gradually increasing. With the advantages of low-energy consuming, low-heat dissipation, light-weight and non-luminescence, liquid crystal displays (LCD) have been widely used in the electronic products and even have replaced the traditional CRT displays.

An LCD basically consists of polarizers, glass electrodes and liquid crystal materials. The polarizers are made by sandwiching the polarizer material between two transparent films. The glass electrodes are made of high quality flat glass which is plated with a layer of conductive film of metallic oxidation. When the liquid crystal molecules are applied with electric field, they are easily re-arranged into a different alignment state, thereby resulting in different transmittance according to the electric field applied and displaying image in the LCD. The manufacturing process of LCD substantially includes the steps of injecting the liquid crystal material into the space between the two flat glasses with glass electrodes thereon, and adhering polarizer films onto the outer surfaces of the flat glasses so as to form the LCD cell. Then the driving circuits, controlling circuit, and backlight components, etc., will be assembled to constitute an LCD module.

Further, for conventional manufacturing processes of a thin film transistor (TFT) substrate, a tri-layer process or a back channel etch (BCE) process is employed for facilitating the TFT matrix. Conventionally, six to nine masking steps are required for both the BCE process and the tri-layer process so as to form a layered TFT structure on a glass substrate. In this TFT structure, disposed on the glass substrate are a first conductive layer and a second conductive layer in turn, and an insulation layer is sandwiched therebetween. The first conductive layer is used to form scan lines and gate electrodes of a TFT unit, and is generally referred to as "metal one". The second conductive layer is used to form data lines and source/drain electrodes of a TFT unit, and is generally referred to as "metal two".

The first and second conductive layers which are opaque are typically made of metal, such as chrome and aluminum, and cooperate with an Indium-Tin-Oxide (ITO) electrode on the perimeter (the out lead bonding region) of the TFT substrate to form terminals or leads. The first and second conductive layers are formed as parallel lines on the displaying region of the TFT substrate and the lines are gathered to form a plurality of terminal groups on the out lead region. The terminal groups are corresponding to tape carrier packages for electrically connecting to the driving circuits and/or the controlling circuits.

As shown in FIG. 1, it depicts a typical LCD module 10 provided with a metal frame 12. The LCD module 10 substantially comprises an LCD panel 14 and a back light module 16. The LCD panel 14 includes a TFT substrate 18 and a color filter (CF) substrate 20. The back light module 16 comprises a light source (not shown), a light guiding plate 22, and a multi-layer prismatic plate 24.

As shown in the drawing, the TFT substrate 18 is illuminated with the back light module 16 and a differential distance Ws exists between the real width and the ideal width W of the black matrix layer of the CF substrate 20. Therefore, the light may leak (shown by the arrow in the drawing) from the region between the metal frame 12 and the CF substrate 20. When the LCD module 10 is observed with an angle larger than θ, the leaking light may cause visibly bright lines in the edge of the metal frame 12. Also, on an outlead bonding region of the LCD module 10, the metal terminals are opaque and are gathered to form a plurality of groups corresponding to the driving circuits and the controlling circuits, so the uneven luminance is formed on the perimeter (the outlead bonding region) of the LCD module 10. This uneven luminance is corresponding to the location of the terminal groups. Further, because of the design of lightening the module and increasing the opening of the metal frame and the visible area, the problem of the light leakage became more serious.

Thus, U.S. Pat. No. 5,850,275 entitled "Liquid Crystal Display" issued on Dec. 15, 1998 to Watanabe et al., incorporated herein by reference, discloses a liquid crystal display having a light shield material provided on regions adjacent to but not touching the terminal groups and the outgoing line groups to decrease this uneven luminance on the perimeter of the LCD. However, the light shield area is formed with the same materials as that of the terminals and the outgoing lines in the same process simultaneously, i.e. the light shield area, the terminals and the outgoing lines are constituted by the same metal layer. Therefore, the light shield area mentioned above cannot be formed between the lines, so the problem of the light leakage on the edge of the LCD module still has not been solved.

Accordingly, there exist needs for providing a suitable device for preventing the light from leaking through the out lead bonding region on a TFT substrate of an LCD, thereby providing the even luminance on the edge of the LCD.

SUMMARY OF THE INVENTION

It is a primary object of the present invention to provide a liquid crystal display device having two substrates and a back light module, wherein one of the two substrates is provided with a light shield device for effectively preventing the light leakage of the back light module.

It is another object of the present invention to provide a thin film transistor (TFT) substrate having a light shield device without any extra process.

In order to achieve the objects mentioned hereinabove, the present invention provides an LCD device comprising: transparent pixel electrodes, a first substrate, a second substrate, a liquid crystal material, and a light shield device. The first substrate has a plurality of terminals electrically connected to the transparent pixel electrodes via outgoing lines, and the terminals are gathered to define a plurality of terminal groups, thereby defining a plurality of outgoing line groups. The second substrate has opposing electrodes opposite to the transparent pixel electrodes. The liquid crystal material is sealed between the first and second substrates. The light shield device is adjacent to the outgoing line groups and the terminal groups and adjacent to the outgoing lines within the outgoing line groups and the terminals within the terminal groups, but not touching the outgoing lines and the terminals thereby preventing the light leakage on the edge of the liquid crystal display.

According to another aspect of the present invention, the first substrate further comprises a transparent substrate, a first conductive layer disposed on the transparent substrate, an insulation layer disposed on the first conductive layer, and a second conductive layer disposed on the insulation layer, wherein the outgoing lines and the terminals are formed by the second conductive layer, and the light shield device is formed by the first conductive layer.

According to a further aspect of the present invention, the light shield device is formed as a one-piece integral structure.

According to still another aspect of the present invention, the light shield device comprises a plurality of light shield strips and a plurality of light shield sheets disposed between the outgoing lines and between the terminals.

As mentioned above, the LCD device according to the present invention comprises the light shield devices disposed on the TFT substrate, so the light of the back light module can not pass through the TFT substrate, thereby preventing the light leakage on the area between the metal frame of the LCD and the CF substrate and maintaining the quality of the display.

BRIEF DESCRIPTION OF THE DRAWINGS

Other objects, advantages, and novel features of the invention will become more apparent from the following detailed description when taken in conjunction with the accompanying drawings.

DESCRIPTION OF THE PREFERRED EMBODIMENT

Figure 1:
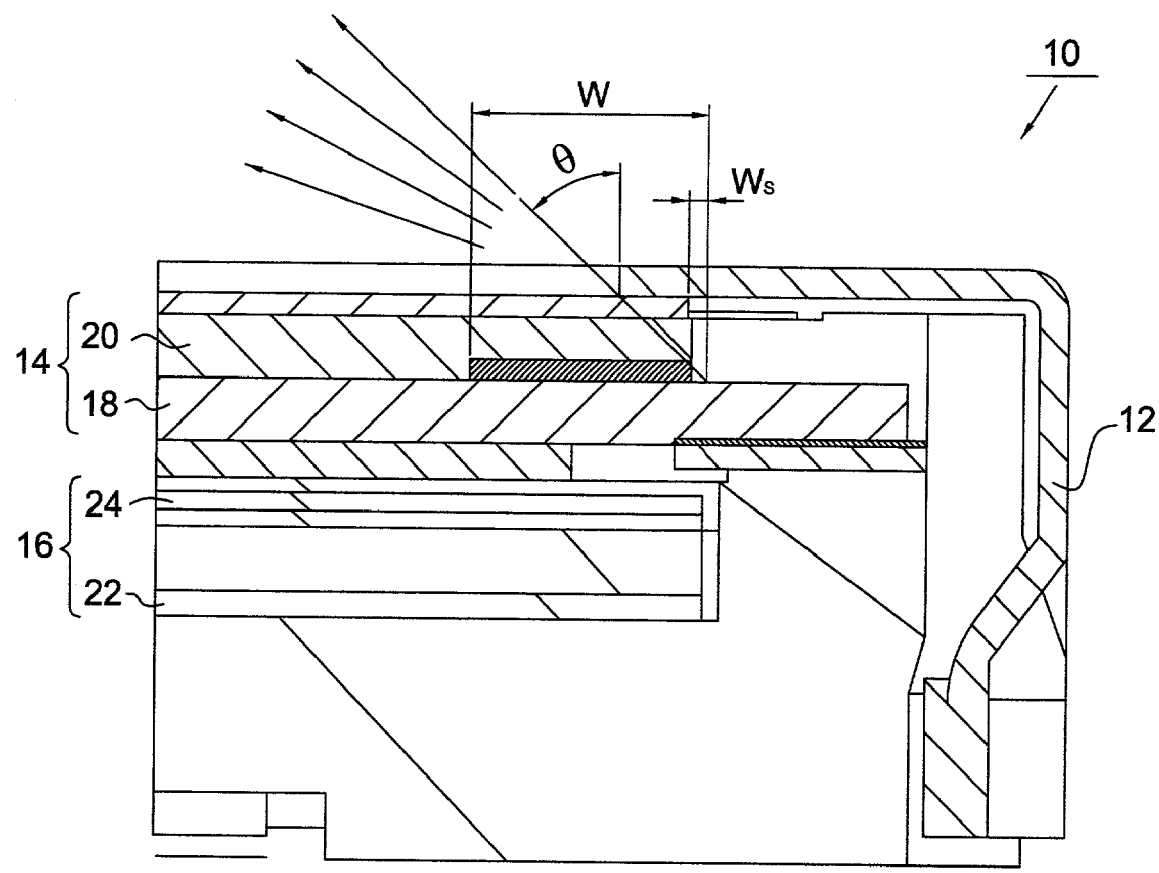
FIG. 1 is a partial cross-sectional schematic view of an LCD module in the prior art.
Figure 2:
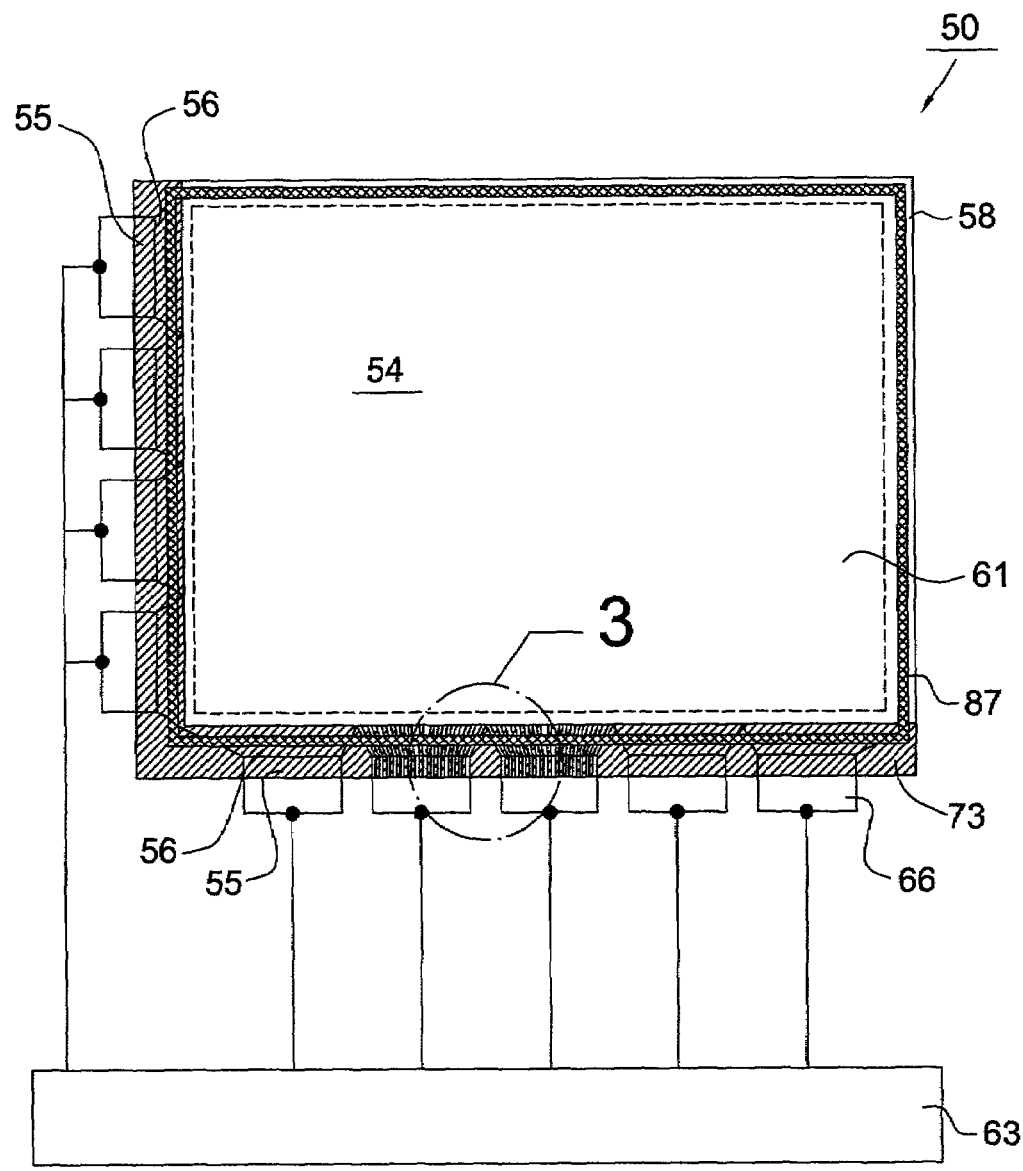
FIG. 2 is a system schematic view of a TFT substrate and the driving/controlling circuits of an LCD device according to a preferred embodiment of the present invention.

Now referring to FIGS. 2, 3, 4, and 5, they depict a liquid crystal display panel 54 of a liquid crystal display (LCD) module 50 according to a preferred embodiment of the present invention. As shown in FIG. 2, the panel 54 comprises a thin film transistor (TFT) substrate 58, and a color filter (CF) substrate 60 (shown in FIG. 5) disposed above the TFT substrate 58 and slightly smaller than the TFT substrate 58. The TFT substrate 58 comprises a displaying portion 61 having a plurality of transparent pixel electrodes, and outgoing groups 56 electrically connected to the pixel electrodes, terminal groups 55, and light shield devices 73. The LCD panel 54 is connected to carrier tapes 66 through the respective terminal groups 55 such that the pixel electrodes are electrically connected to driving and/or controlling circuits 63. The TFT substrate 58 further comprises a seal member 87 for cooperating with the CF substrate 60 to seal a liquid crystal material therebetween.

Figure 3:
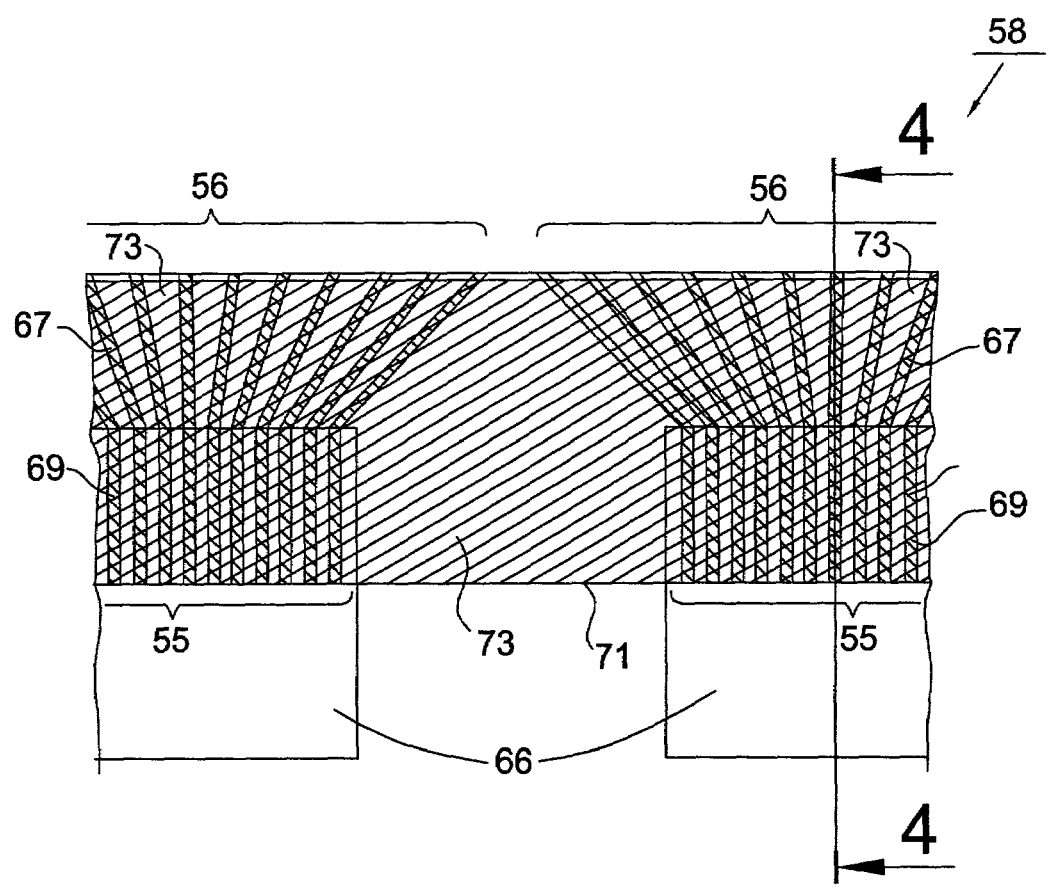
FIG. 3 is a partial enlarged top plan view of the area 3 shown in FIG. 2.

Now referring to FIG. 3, it depicts an enlarged view of the area 3 shown in FIG. 2. The TFT substrate 58 comprises a plurality of outgoing lines 67 extending outward to the perimeter of the TFT substrate 58, thereby forming a plurality of terminals 69. The plurality of outgoing lines 67 are gathered on the perimeter of the TFT substrate 58 to form a plurality of outgoing line groups 56 and the plurality of the terminals 69 are gathered as terminal groups 55. The terminal groups 55 are connected to the carrier tapes 66 for electrically connecting to the driving and/or the controlling circuits 63 which is outside the TFT substrate 58. These outgoing lines 67 and the terminals 69 are disposed on the perimeter of the TFT substrate 58 to define an out lead bonding region, which is substantially L-shaped, on the TFT substrate 58.

As shown in the drawing, there is a transparent glass substrate 71 of the TFT substrate 58 between the respective terminals 69 and the outgoing lines 67, so the light leaks therefrom. Thus, the TFT substrate 58 according to the present invention comprises a light shield device 73 to avoid the light leakage. The light shield device 73 is a one-piece integral structure covering the entire out lead bonding region.

Figure 4A:
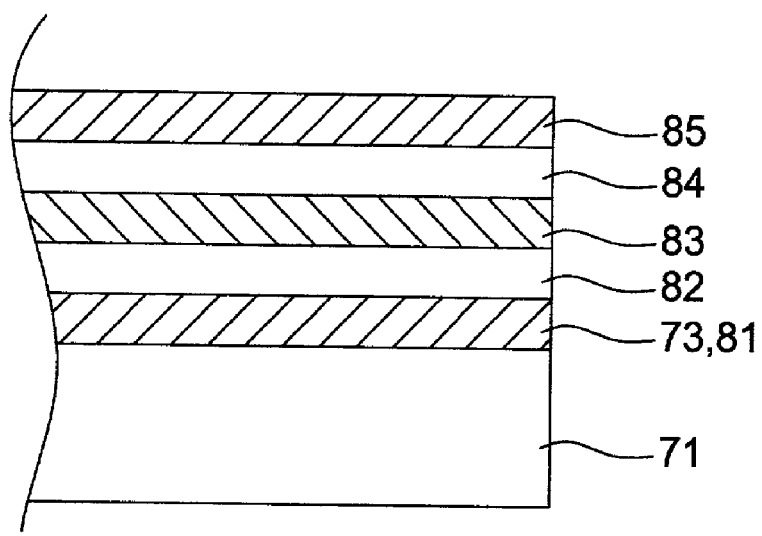
FIGS. 4a and 4b are cross-sectional schematic views of the TFT substrate according to the preferred embodiment of the present invention along the line 4—4 in FIG. 3.
Figure 4B:
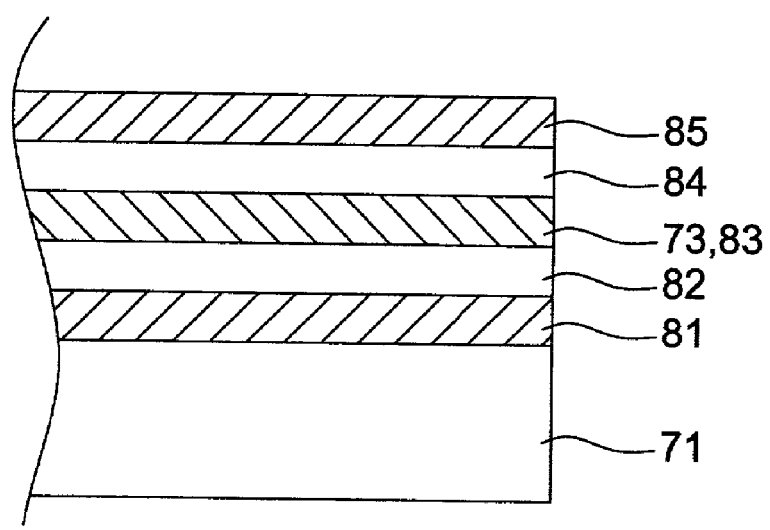

Now referring to FIG. 4a, it depicts a partial cross-sectional view of the TFT substrate 58 according to the present invention. As mentioned above, the TFT substrate 58 substantially has a laminated structure, and substantially comprises the transparent glass substrate 71 with a first conductive layer 81, an insulation layer 82, a second conductive layer 83, an insulation layer 84, and transparent electrode layer 85 disposed thereon in turn. In a preferred embodiment according to the present invention, the outgoing lines 67 and the terminals 69 are formed by the second conductive layer 83, and are electrically connected to the transparent electrode layer 85 on the outer surface of the TFT substrate 58. The light shield device 73 is formed by the first conductive layer 81 to prevent the light from leaking. Alternatively, as shown in FIG. 4b, the light shield device 73 also can be formed by the second conductive layer 83, and the outgoing lines 67 and the terminals 69 are formed by the first conductive layer 81.

It will be appreciated by those skilled in this art that, as mentioned above, the light shield device 73 and the outgoing lines 67 and the terminals 69 are made of different conductive layers, so the light shield device 73 can be formed as an integral structure and overlap with the outgoing lines 67 and the terminals 69, thereby providing a complete light shield effect.

Figure 5:
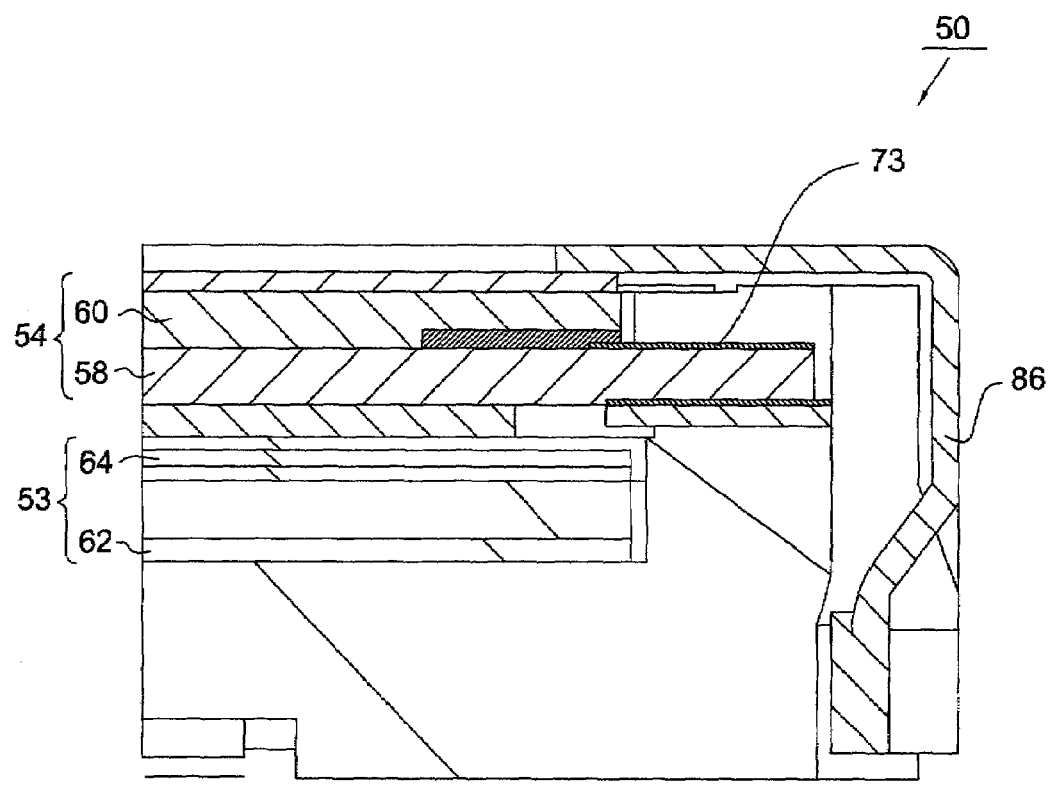
FIG. 5 is a partial cross-sectional schematic view similar to FIG. 1, showing an LCD module according to the preferred embodiment of the present invention.

Again, as shown in FIG. 5, it depicts a partial cross-sectional view of the LCD module 50 according to the present invention. The LCD module 50 comprises a back light module 53 including a light source (not shown), a light guiding plate 62, and a multi-layer prismatic plate 64. The light shield device 73 is positioned on the TFT substrate 58, so the light of the back light module 53 will not pass through the TFT substrate 58, thereby preventing the light leakage on the area between the metal frame 86 and the CF substrate 60 and improving the display quality. It will be appreciated by those skilled in the art that the CF substrate 60 further comprise an opposing electrode for cooperating with the pixel electrode on the TFT substrate to control the displaying of the LCD device.

Figure 6:
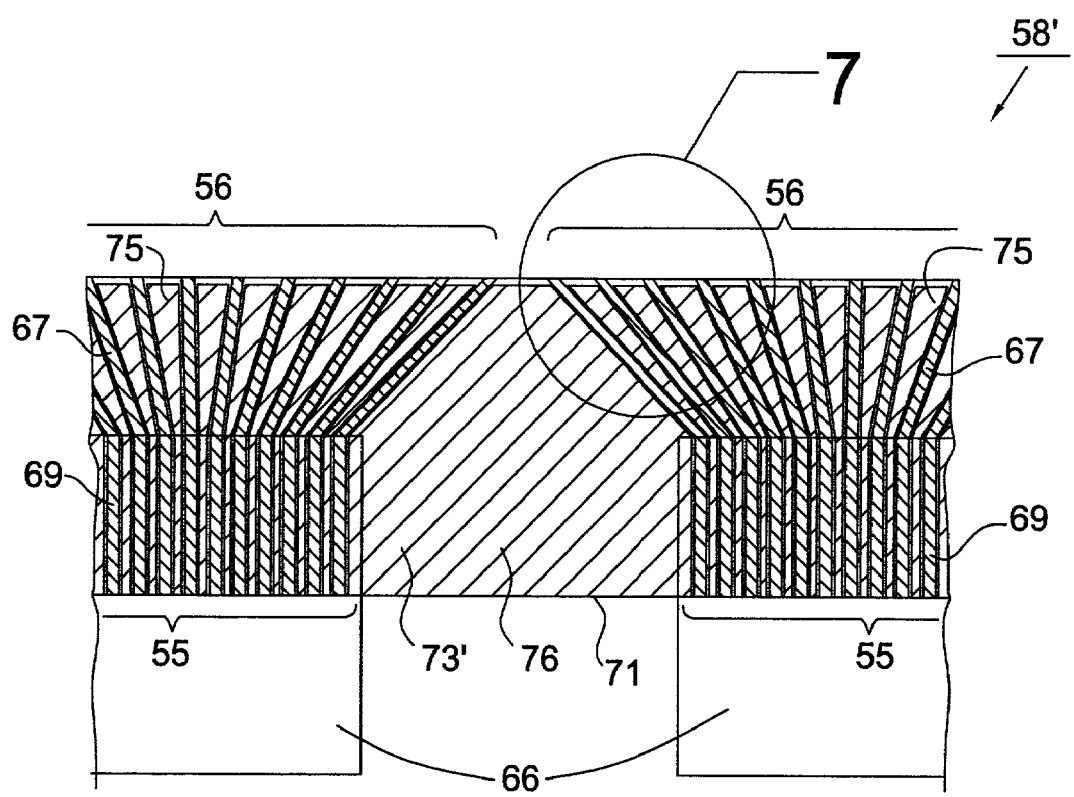
FIG. 6 is a partial enlarged top plan view similar to FIG. 3, showing a TFT substrate according to another preferred embodiment of the present invention.
Figure 7:
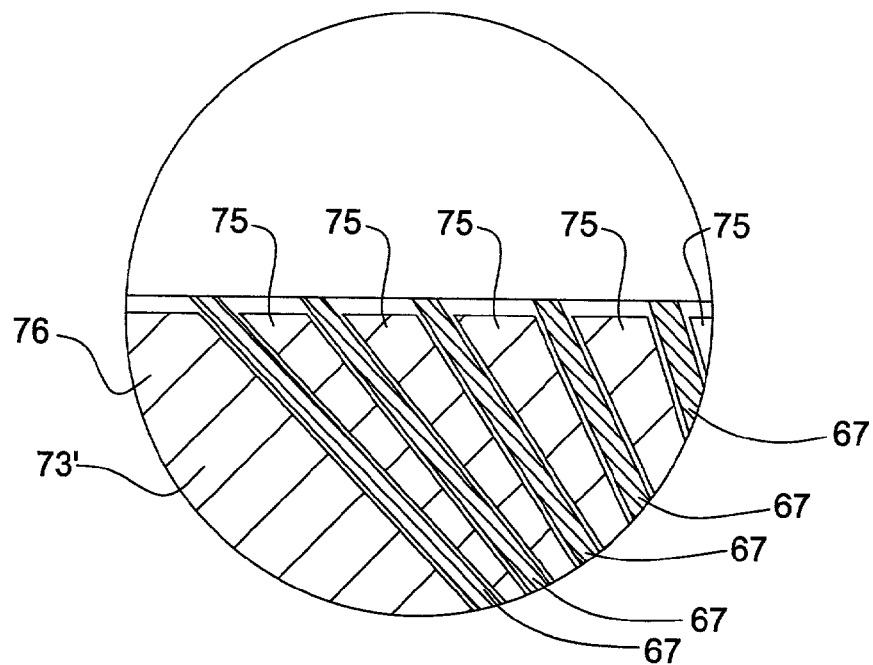
FIG. 7 is a partial enlarged plan view of the area 7 in FIG. 6.

Now referring to FIG. 6, it depicts a view of a TFT substrate 58' according to another embodiment of the present invention similar to that in FIG. 3, wherein like reference numerals refer to corresponding parts. The TFT substrate 58 comprises a one-piece integral light shield device 73, but the integral light shield device 73 is easy to cooperate with the terminals 69 and the outgoing lines 67 and cause the short-circuit and capacitive reactance, thereby affecting the performance of the TFT substrate 58. Therefore, the TFT substrate 58' is provided with a plurality of separate light shield devices 73' divided by the outgoing lines 67 and the terminals 69. The light shield devices 73' substantially comprise a plurality of light shield strips 75 and a plurality of light shield sheets 76. The light shield strips 75 are located between the respective outgoing lines 67 and between the respective terminals 69. The light shield sheets 76 are located between the respective outgoing line groups 56 and between the respective terminal groups 55. As shown in FIG. 7, which depicts a partial enlarged view of the area 7 in FIG. 6, the light shield strips 75 and the light shield sheets 76 are spaced apart from the outgoing lines 67 and the terminals 69.

Figure 8:
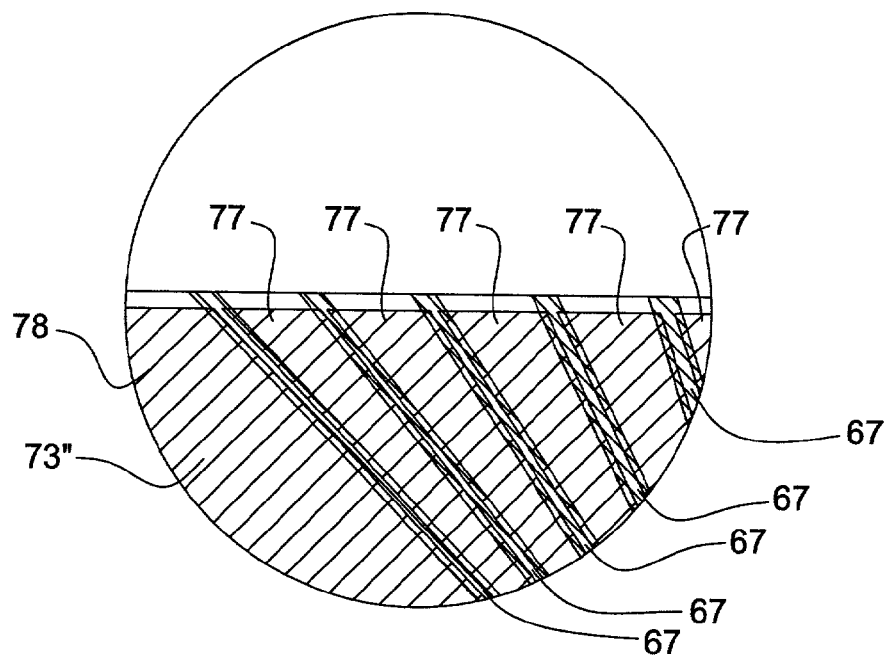
FIG. 8 is a partial enlarged plan view similar to FIG. 7, showing a TFT substrate according to another alternative embodiment of the present invention.

Now referring to FIG. 8, it depicts a view of a TFT substrate 58" according to another embodiment of the present invention similar to that in FIG. 3, wherein like reference numerals refer to corresponding parts. The TFT substrate 58" is provided with a plurality of separate light shield devices 73" divided by the outgoing lines 67 and the terminals 69. The light shield devices 73" substantially comprise a plurality of light shield strips 77 and a plurality of light shield sheets 78. The light shield strips 77 are located between the respective outgoing lines 67 and between the respective terminals 69. The light shield sheets 78 are located between the respective outgoing line groups 56 and between the respective terminal groups 55. The edge regions of the light shield strips 77 and the light shield sheets 78 are overlapped with the edge regions of the outgoing lines 67 and the terminals 69.

As mentioned above, the TFT substrates according to the present invention take advantage of the first conductive layer and the second conductive layer of the substrate for forming the light shield device, and thus the leakage of the light of the back light module can be effectively prevented without any extra process. Further, the light shield device is adjacent to the outgoing line groups and the terminal groups and adjacent to the outgoing lines of the outgoing line groups and the terminals of the terminal groups, but not contacting the outgoing lines and the terminals, thereby completely preventing the light leakage of the back light module.

Although the invention has been explained in relation to its preferred embodiments, it is to be understood that many other possible modifications and variations can be made without departing from the spirit and scope of the invention as hereinafter claimed.

What is claimed is:

1. A liquid crystal display, comprising:
a plurality of transparent pixel electrodes;
a first substrate comprising
a transparent substrate,
a light shield device formed of a first conductive layer on top of the transparent substrate for preventing light leakage of the liquid crystal display,
an insulation layer disposed on top of the light shield device, and
a plurality of terminals and outgoing lines formed of a second conductive layer on top of the insulation layer, said terminals being electrically connected to the transparent pixel electrodes via said outgoing lines, wherein the terminals and outgoing lines are grouped into a plurality of terminal groups and outgoing line groups, respectively;
a second substrate having opposing electrodes opposite to the transparent pixel electrodes; and
a liquid crystal material sealed between the first and second substrates;
wherein said light shield device is adjacent to the outgoing line groups, the terminal groups, the outgoing lines within the outgoing line groups and the terminals within the terminal groups, is at a level below the outgoing lines and the terminals, and is spaced from the outgoing lines and the terminals by a thickness of said insulation layer.

2. A liquid crystal display as claimed in claim 1, wherein the light shield device is formed as a one-piece integral structure.

3. A liquid crystal display as claimed in claim 1, wherein the light shield device comprises
a plurality of light shield strips, each of said light shield strips being disposed between one pair of two adjacent outgoing lines and between the terminals respectively connected to said two adjacent outgoing lines; and
a plurality of light shield sheets, each of said light shield sheets being disposed between one pair of two adjacent outgoing line groups and between the terminal groups respectively corresponding to said two adjacent outgoing line groups.

4. A liquid crystal display as claimed in claim 3, wherein edge regions of the light shield strips are overlapped with edge regions of the outgoing lines and the terminals.

5. A liquid crystal display as claimed in claim 3, wherein the light shield strips are spaced apart from the outgoing lines and the terminals.

6. A liquid crystal display as claimed in claim 3, wherein edge regions of the light shield sheets are overlapped with edge regions of the outgoing line groups and the terminal groups.

7. A liquid crystal display as claimed in claim 3, wherein the light shield sheets are spaced apart from the outgoing line groups and the terminal groups.

8. A liquid crystal display, comprising:
a plurality of transparent pixel electrodes;
a first substrate comprising
a transparent substrate,
a plurality of terminals and outgoing lines formed of a first conductive layer on top of the transparent substrate, said terminals being electrically connected to the transparent pixel electrodes via said outgoing lines, wherein the terminals and outgoing lines are grouped into a plurality of terminal groups and outgoing line groups, respectively;
an insulation layer disposed on top of the terminals and outgoing lines, and
a light shield device formed of a second conductive layer on top of the insulation layer for preventing light leakage of the liquid crystal display;
a second substrate having opposing electrodes opposite to the transparent pixel electrodes; and
a liquid crystal material sealed between the first and second substrates;
wherein said light shield device is adjacent to the outgoing line groups, the terminal groups, the outgoing lines within the outgoing line groups and the terminals within the terminal groups, is at a level above the outgoing lines and the terminals, and is spaced from the outgoing lines and the terminals by a thickness of said insulation layer.

* * * * *